United States Patent [19]

Truchet

[11] Patent Number: 5,024,467
[45] Date of Patent: Jun. 18, 1991

[54] DEVICE FOR COUPLING ELEMENT-HOLDING PLATES OF MULTIPLE CONNECTIONS

[75] Inventor: Gaston Truchet, Faverges, France

[73] Assignee: S.A. des Etablissements Staubli, Faverges, France

[21] Appl. No.: 408,365

[22] Filed: Sep. 18, 1989

[30] Foreign Application Priority Data

Sep. 21, 1988 [FR] France ................. 88 12557

[51] Int. Cl.⁵ ............................................. F16L 35/00
[52] U.S. Cl. ........................................ 285/36; 285/24; 285/18; 29/237; 29/281.5
[58] Field of Search .......... 285/24, 26, 27, 29, 285/137.1, 161, 302, 36, 18; 29/237, 256, 281.1, 281.5

[56] References Cited

U.S. PATENT DOCUMENTS

| 4,189,817 | 2/1980 | Moebius ........................... 29/237 |
| 4,609,209 | 9/1986 | Ralls ................................ 285/24 |
| 4,613,161 | 9/1986 | Brisco ........................... 285/24 X |
| 4,653,172 | 3/1987 | Hackley ........................ 285/18 X |
| 4,671,324 | 6/1987 | Neill ............................. 285/27 X |
| 4,769,889 | 9/1988 | Landman et al. ............. 285/18 X |
| 4,770,207 | 9/1988 | Hofmann .................... 285/137.1 X |
| 4,770,250 | 9/1988 | Bridges et al. ............... 285/18 X |
| 4,809,747 | 3/1989 | Choly et al. .................. 285/18 X |
| 4,856,594 | 8/1989 | Jennings ...................... 29/237 X |
| 4,862,725 | 9/1989 | Stiver et al. .................. 29/237 X |
| 4,889,149 | 12/1989 | Weaver et al. ............... 285/18 X |
| 4,889,368 | 12/1989 | Laipply ........................... 285/18 |
| 4,902,044 | 2/1990 | Williams et al. ................ 285/18 |
| 4,903,994 | 2/1990 | Buckley ........................... 285/26 |

Primary Examiner—Dennis L. Taylor
Assistant Examiner—J. Russell McBee
Attorney, Agent, or Firm—Dowell & Dowell

[57] ABSTRACT

A device for coupling elements which are connected in line and which elements are carried by opposing holding plates wherein one of the plates is urged toward the other and threadingly locked with respect thereto by a rotating shaft having a threaded end portion which is engagable with a threaded member associated with the other plate and wherein the advancement of the threaded shaft is resiliently retarded in order to permit a proper meshing of the threaded elements upon their initial engagement.

9 Claims, 3 Drawing Sheets

DEVICE FOR COUPLING ELEMENT-HOLDING PLATES OF MULTIPLE CONNECTIONS

BACKGROUND OF THE INVENTION

1. Field of the Invention

This invention is directed to devices for coupling and uncoupling opposing connection elements such as pipes or conduits wherein the connection elements are carried by plates which are movable relative to one another and wherein the connection elements are locked in sealed coupling relationship by using intermeshing screw threaded members associated with each plate.

2. History of the Related Art

Coupling devices which include two plates which are movable with respect to one another and wherein each of the plates forms a support for a series of connection elements adapted to cooperate with aligned elements carried by the other plate are well known. The connection elements of one or the other of the two plates normally includes valves or contacts associated with resilient members which exert an appreciable resistance which opposes the interfitting of the connection elements and which frequently tends to promote a separation of the elements. It is therefore usually necessary to use a separate coupling device with the two plates to retain the plates in coupled position against any repulsive forces.

The known coupling devices are generally of complex construction and have proven to be unreliable. Moreover, they often require the continuous input of energy for retaining the connection elements, such as pipes, in a coupled relationship, so that, in the event of an unexpected breakdown in the energy supply the connection elements may become disconnected thereby permitting the escape or flow into the atmosphere of a fluid conveyed by the connected pipes. In addition, known devices are relatively cumbersome thus hindering their installation with respect to the connection elements which are to be brought into coupled relationship.

SUMMARY OF THE INVENTION

It is a principle object of the present invention to overcome the aforementioned drawbacks essentially by coupling the plates which carry the elements to be connected with the aid of two threaded members, which may be a screw and nut, and of which one is rotated and advanced so as to mesh with the other in such a manner that the two plates are drawn into a secure and locked relationship with respect to one another. Resilient elements are associated with at least one of the threaded members in order to interrupt the advancement of the members relative to one another until their threads are properly meshed or engaged.

DESCRIPTION OF THE PREFERRED EMBODIMENT

Figure 1:
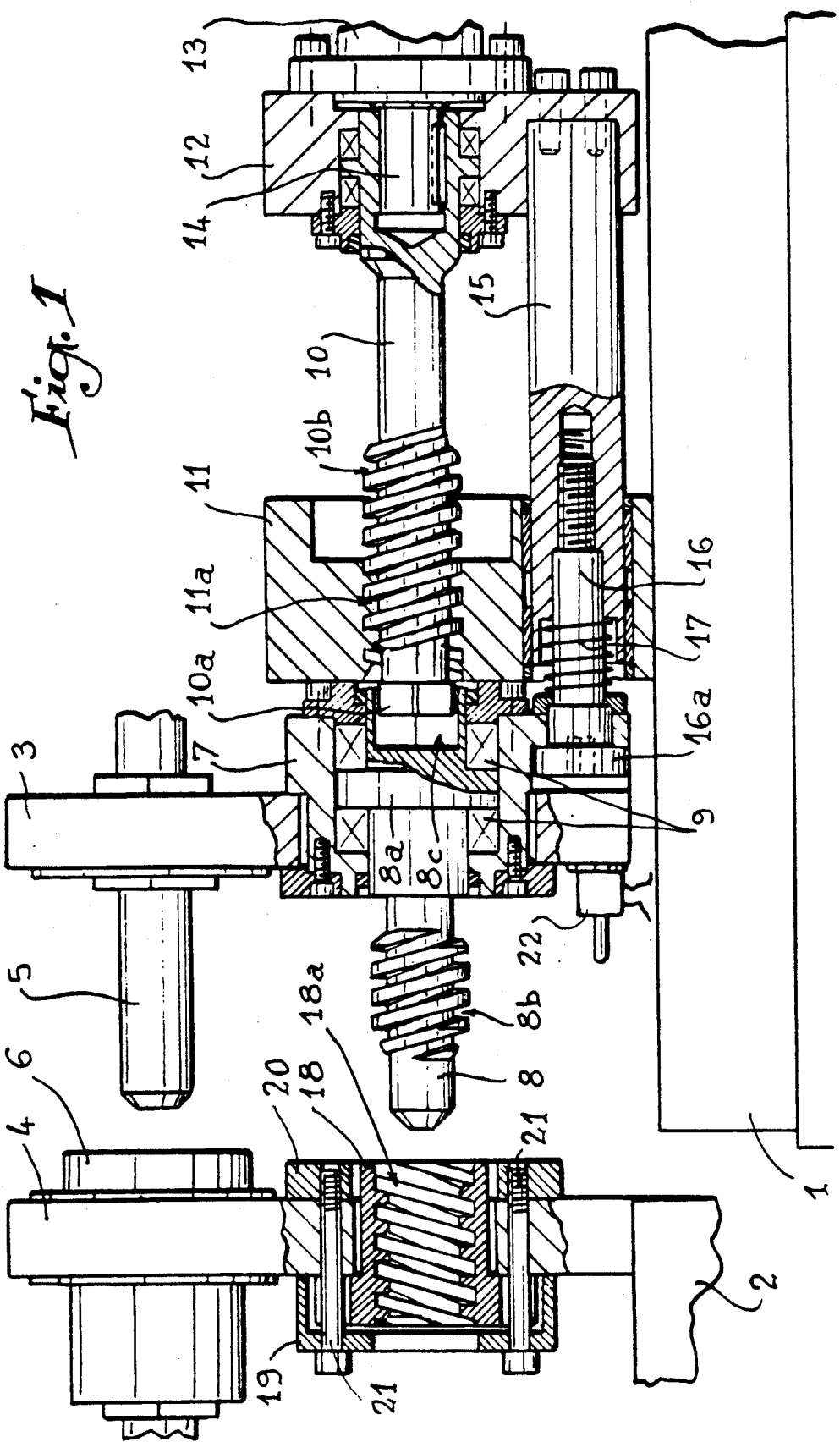
FIG. 1 is a partial cross-sectional view of the coupling device according to the invention showing the plates carrying the connection elements in spaced relationship with respect to one another.

Referring now to the drawings, the coupling device according to the invention is intended to join the connection elements such as pipes and conduits mounted to base elements or parts, referenced 1 and 2 in the drawings. Base 1 will be considered as a fixed principle component against which part 2 is mounted so as to be movable with respect thereto. The coupling device incorporates two plates, 3 and 4, secured with the base components 1 and 2 with plate 3 supporting male connection elements 5 intended to be fitted inside the female connection elements 6 which are supported by plate 4.

According to the invention, plate 4 is rigidly secured with the base component 2 while plate 3 is carried by a movable ring 7 which is axially traversed by a rod 8. Rod 8 includes an annular shoulder 8a on either side of which are mounted two roller bearings 9 which enable the rod to rotate freely while remaining axially fixed relative to the ring 7.

One of the ends of the rod 8, the one facing left in the drawings, comprises a threaded portion 8b while the opposite end is hollowed with a blind axially aligned chamber 8c which is square in section in order to receive an end piece 10a of the same cross-section provided at the end of a rotating shaft 10 which extends axially toward the rod 8. To the rear of the end piece 10a, the shaft includes a threaded portion 10b which is intended to cooperate with a threaded tapping 11a made horizontally in fixed frame 11 which is mounted to the principle base 1.

Opposite the end piece 10a, the shaft 10 is shaped so as to be supported by a chassis 12 with which it is mounted in fixed relationship. The chassis 12 forms a support for a low-speed motor 13, such as a hydraulic or electric gear motor. The motor includes a drive shaft 14 which extends inside an axial chamber of the shaft 10 to which it is connected.

The fixed frame 11 is slidably traversed by horizontal guides 15 which are preferably three in number although only one is shown in the drawings. One of the ends of the guides 15 is secured to the chassis 12. A screw 16 is fixed to the opposite end of each guide 15 and includes a head 16a which abuts against a lug of the ring 7. Between the ring and the end wall of an axial chamber formed in each guide 15 there is provided a spring 17 which encircles the corresponding screw 16.

Opposing and axially aligned with rod 8 which is secured to plate 3 is a threaded member in the form of a nut 18. The nut 18 is retained inside a cage formed by a cap 19 assembled on a disk 20 using bolts 21 which traverse the plate 4. It will be observed that the nut 18 and the cage 19, 20 are advantageously shaped to allow the nut to have a slight degree of movement to alter its angular orientation.

Operation of the coupling device is as follows. When base 2 has been assembled relative to base 1 and with the movable assembly including the ring 7, the chassis 12 and the horizontal guides 15 in the position shown in FIG. 1, in order to effect coupling of the two plates 3 and 4 the motor 13 is activated. Upon activation of the motor the shaft 10 rotates the threaded part 10b within the tapping 11a of the fixed frame 11 and consequently axially advances the ring 7, the chassis 12 and the guides 15. Plate 3 thus moves closer to plate 4 until the male element 5 begins to engage in the female element 6.

At a given moment of the advancement of the rod 8, the threaded end piece 8b will engage against the opening of the tapping 18a of the nut 18. If the threads are not in the proper angular position to allow their immediate engagement, ring 7 momentarily ceases its advancement and no longer engages the heads 16a of the screw 16 resulting in a compression of spring 17. As the shaft 10 continues to rotate and advance axially, the rod 8 will rotate without moving axially due to the clearance or space created within the end piece 10a inside the chamber 8c. As soon as the threads are in registry so that threads 8b mesh with tapping threads 18a, the plate 3, ring 7, shaft 10 and guides 15, chassis 12 and motor 13 will again advance at the same speed as the threaded portion 10b meshes with the tapping 11a.

Figure 2:
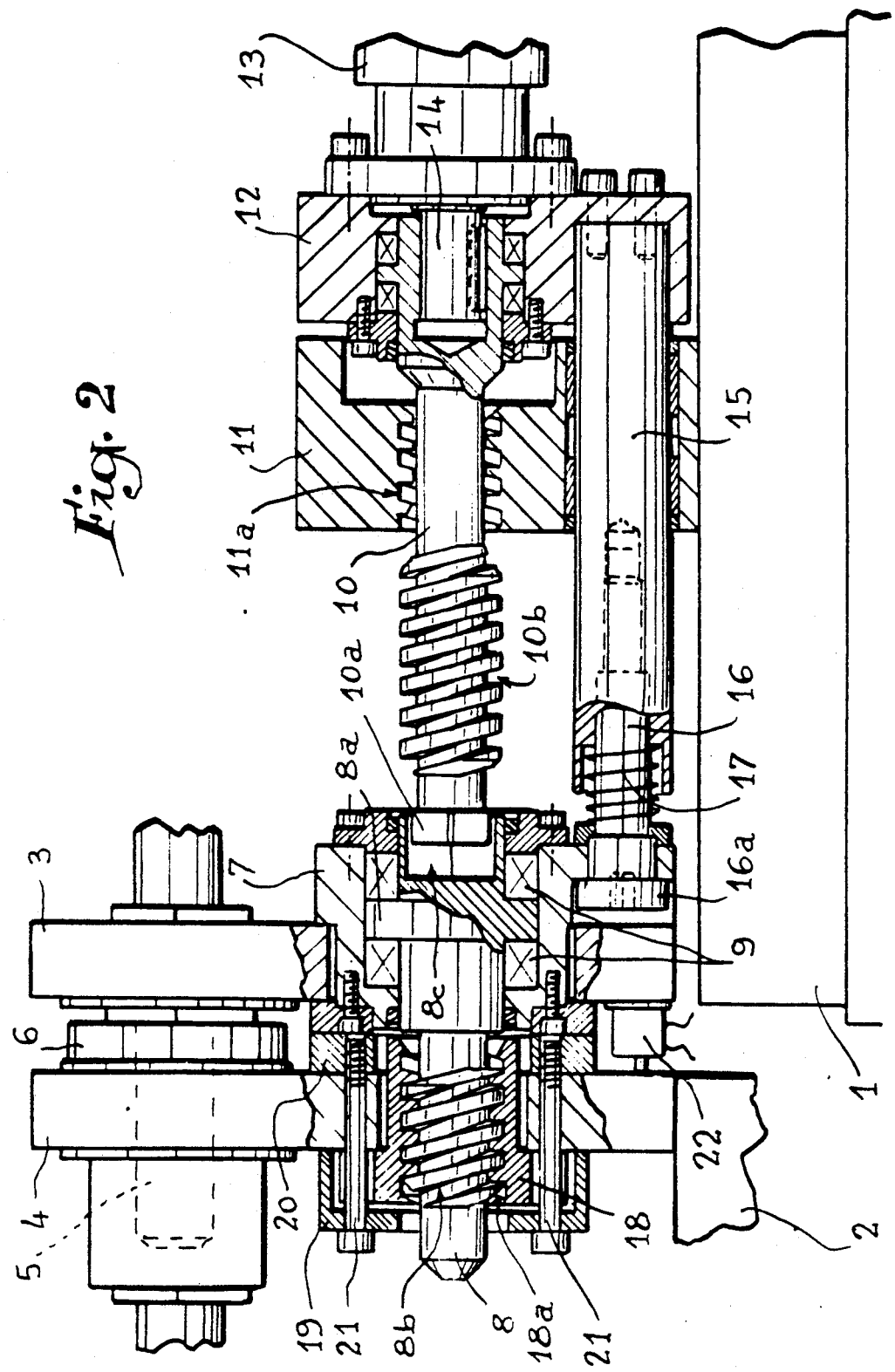
FIG. 2 is a partial cross-sectional view similar to that of FIG. 1 showing the plates and the connection elements in a coupled position.

As soon as the threaded portion 10b passes through the tapping 11a, the spring 17 will ensure the resilient return or shifting of the movable assembly, including the shaft 10, guides 15, chassis 12 and motor 13, thereby preventing any further force to be exerted from the frame 11 against the plate 4 and consequently allowing end piece 8b to be screwed into the nut 18. Thereafter, plate 3 is moved into close relationship to plate 4 by the interengagement of the threads 8b and the tappings 18a. The motor 13 acts to resist any reverse threading of the engaging members thereby ensuring the coupled relationship of the elements 5 in the element 6 in the relationship shown in FIG. 2 of the drawings. Energy to the motor 13 is automatically stopped by a sensor switch 22 carried by the front face of ring 7.

The parts 8b and 18a cannot be unthreaded after the motor is stopped with the result that the threaded parts are capable of withstanding and counteracting any uncoupling efforts or forces which may be exerted on plates 3 and 4. Plates 3 and 4 will thereafter be moved to disconnect elements 5 and 6 only upon the activation of the motor in a reverse direction of rotation. During the return stoke, the spring 17 intervenes to again allow correct engagement of the threads 10b with respect to the tappings 11a.

Figure 3:
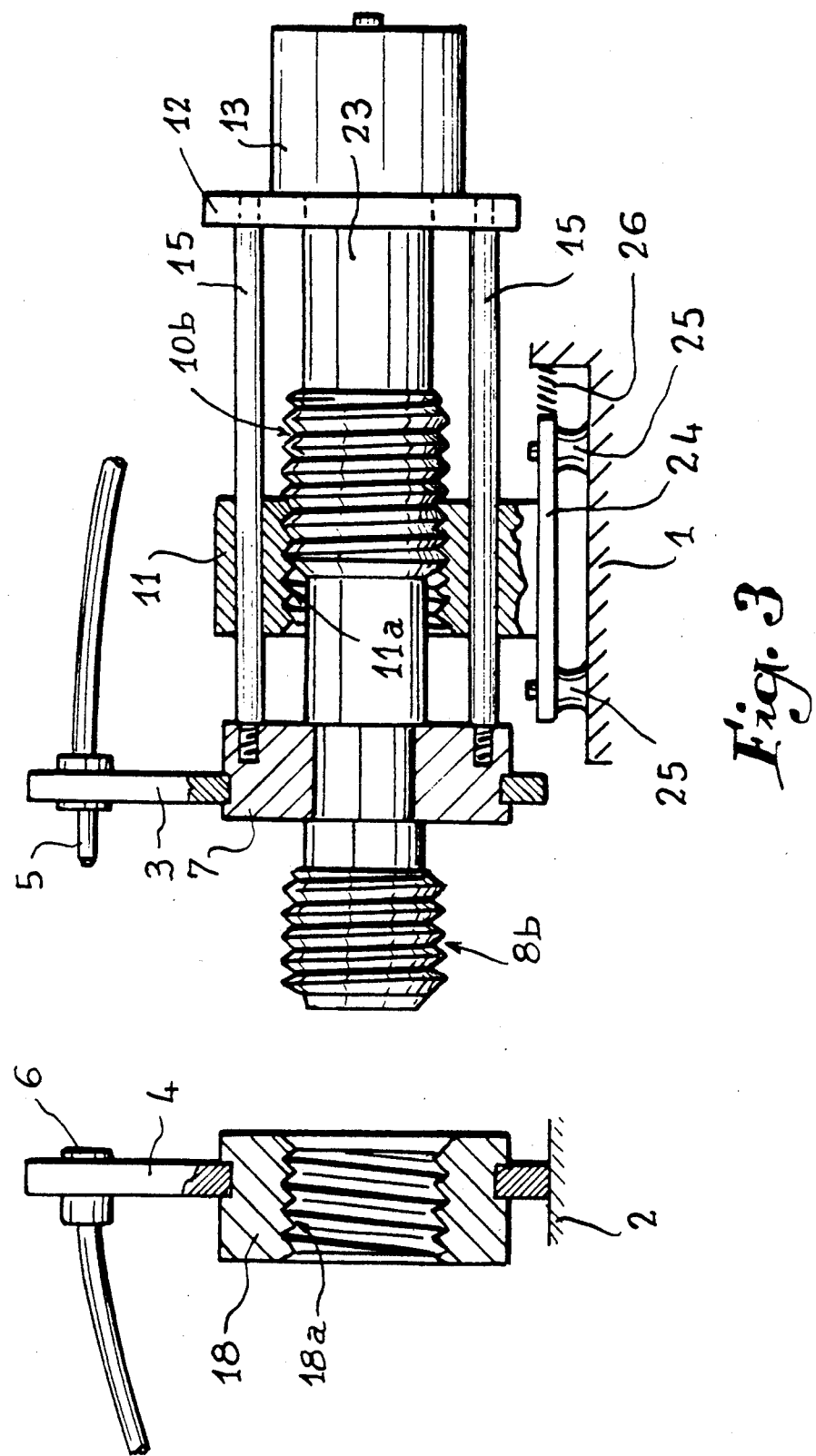
FIG. 3 schematically illustrates a second embodiment of the invention.

FIG. 3 illustrates schematically an alternate embodiment of the invention. The ring 7 which carries plate 3 in this embodiment is connected to chassis 12 by guides 15 which have no provision for resilient or elastic deformation so that the threaded screw part 8b adapted to cooperate with nut 18 and threaded part 10b which is threadable with tapping 11a of frame 11 may be carried by the same rigid shaft 23 which is driven by motor 13. The frame 11 is mounted to a principle base by a mounting plate 24 which is capable of moving resiliently in a direction parallel to the axis of the shaft 23 so as to prevent the advance of the shaft 23 until the proper meshing of the threads 8b and 18b is established.

In the embodiment according to the FIG. 3, it has been assumed that the resilient support for the base plate 24 with respect to base 1 is effected with the aid of deformable assemblies 25 which may be for example marketed under the trademark "SILENTBLOCK". Further, longitudinal springs 26 may be provided although other types of resilient elements may be employed. It should further be noted that as opposed to resiliently mounting plate 3 relative to the base 1, plate 4 may be resiliently mounted relative to the base 2 so that the nut 18 may be slightly yieldable with respect to rod 8 during the initial engagement of the threaded end portion 8b with the tappings 18a.

What is claimed is:

1. An apparatus for coupling opposing first and second connection elements by the axial movement of the first and second connection elements relative to one another comprising, a first plate means for supporting the first connection elements and a second plate means for supporting the second connection elements, a first threaded member carried by said first plate means and a second threaded member carried by said second plate means, said first and second threaded members being generally axially aligned and interengageable with one another, adjustment means connected to said first plate means for advancing and retracting said first plate means relative to said second plate means, means for rotating said second threaded member as said adjustment means moves said first plate means relative to said second plate means and resilient means for offsetting the advancement of said first plate means relative to said second plate means when said first and second threaded members are initially engaged until said first and second threaded members mesh with one another.

2. The apparatus of claim 1 in which said adjustment means includes a movable ring engaged with said first plate means, said first threaded member including a base portion which is mounted within said movable ring, a fixed frame means, guide rod means having first and second ends and slidably supported through said fixed frame means, a movable chassis, a motor means mounted to said movable chassis, said first end of said guide rod means being engaged with said movable ring and said second ends of said guide rod means being engaged with said chassis.

3. The apparatus of claim 2 in which said adjustment means also includes a tapping provided through said fixed frame means, a shaft means having first and second ends, said second end of said shaft means being rotatably mounted to said motor means, said shaft means further including a threaded portion, said threaded portion being selectively engagable with said threaded tapping of said fixed frame means whereby when said shaft means is rotated said threaded portion thereof will advance and retract said shaft means and said chassis and said guide means relative to said fixed frame means.

4. The apparatus of claim 3 wherein said base portion of said first threaded member includes a hollow chamber, said first end portion of said shaft means being axially slidable within said chamber so that said first threaded member may be rotated by said shaft means without being advanced by said shaft means toward said second threaded member as said first end of said shaft means moves axially within said chamber.

5. The apparatus of claim 4 in which said resilient means includes a spring means associated with said guide rod means, said spring means urging said ring means and said first threaded member outwardly with respect to said shaft means to thereby allow said first threaded member to engage said second threaded member as said threaded portion of said shaft means disengages said threaded tapping of said fixed frame means.

6. The apparatus of claim 5 including stop means mounted to said ring means, said stop means being engageable with said second plate means when said first threaded member is fully engaged with said second threaded member to thereby deenergize said motor means.

7. The apparatus of claim 2 wherein said resilient means includes a resilient base, said fixed member being mounted to said resilient base so that said fixed member is yieldable on said resilient base as said first threaded member engages said second threaded member.

8. The apparatus of claim 2 in which said second threaded member is mounted to a yieldable base.

9. The apparatus of claim 1 wherein said second threaded member includes a nut, a cage enclosing said nut, and means for mounting said nut within said cage so that said nut is movable with respect thereto.

* * * * *